(12) United States Patent
Gurreri et al.

(10) Patent No.: US 8,313,249 B2
(45) Date of Patent: Nov. 20, 2012

(54) MULTI-FIBER FERRULES FOR MAKING PHYSICAL CONTACT AND METHOD OF DETERMINING SAME

(75) Inventors: Michael Lawrence Gurreri, York, PA (US); James David Kevern, Steelton, PA (US); Michael Aaron Kadar-Kallen, Harrisburg, PA (US); Lou Castagna, Middleburg, PA (US); Mike Hughes, Hickory, NC (US); Darrell R Childers, Hickory, NC (US)

(73) Assignees: US Conec, Ltd., Hickory, NC (US); Tyco Electronics Corp., Berwyn, PA (US)

( * ) Notice: Subject to any disclaimer, the term of this patent is extended or adjusted under 35 U.S.C. 154(b) by 0 days.

(21) Appl. No.: 12/248,873

(22) Filed: Oct. 9, 2008

(65) Prior Publication Data

US 2009/0097800 A1 Apr. 16, 2009

Related U.S. Application Data

(60) Provisional application No. 60/978,986, filed on Oct. 10, 2007.

(51) Int. Cl.
*G02B 6/38* (2006.01)
(52) U.S. Cl. ............................................ 385/71; 385/78
(58) Field of Classification Search .................... 385/60, 385/72, 78, 85, 137
See application file for complete search history.

(56) References Cited

U.S. PATENT DOCUMENTS

| | | | | |
|---|---|---|---|---|
| 4,818,061 A | * | 4/1989 | Iwano et al. | 385/72 |
| 5,300,097 A | * | 4/1994 | Lerner et al. | 607/93 |
| 5,631,986 A | * | 5/1997 | Frey et al. | 385/78 |
| 6,669,375 B1 | * | 12/2003 | Bonja et al. | 385/73 |
| 2010/0215319 A1 | * | 8/2010 | Childers et al. | 385/60 |

FOREIGN PATENT DOCUMENTS

JP 2004145140 A * 5/2004

* cited by examiner

*Primary Examiner* — Sarah Hahm
(74) *Attorney, Agent, or Firm* — Michael L. Leetzow, P.A.

(57) ABSTRACT

A multi-fiber ferrule and optical fibers therein make easier contact with other multi-fiber ferrules and connectors with a small fiber tip radius and a modulus of elasticity. A method for qualifying multi-fiber ferrules (and connectors) is also disclosed.

13 Claims, 8 Drawing Sheets

| Comparison of Distribution Metrics | | | | | | | |
|---|---|---|---|---|---|---|---|
| Fibre Height Distribution | Normal Force (N) | Total Coplanarity (μm) | Minus Coplanarity (μm) | Max Height Difference (μm) | Adjacent Height Difference (μm) | RMS Height Deviation (μm) |
| | 1.7 | 0.500 | 0.042 | 0.500 | 0.500 | 0.479 |
| | 3.7 | 0.500 | 0.217 | 0.500 | 0.200 | 0.580 |
| | 4.7 | 0.500 | 0.250 | 0.500 | 0.200 | 0.592 |
| | 6.0 | 0.500 | 0.250 | 0.500 | 0.500 | 0.866 |
| | 8.9 | 0.500 | 0.417 | 0.500 | 0.500 | 0.645 |
| | 12.3 | 0.500 | 0.458 | 0.500 | 0.500 | 0.479 |

MULTI-FIBER FERRULES FOR MAKING PHYSICAL CONTACT AND METHOD OF DETERMINING SAME

REFERENCE TO RELATED CASE

This application claims priority under 35 U.S.C. §119 (e) to provisional application No. 60/978,986, filed on Oct. 10, 2007, which is hereby incorporated by reference in its entirety.

BACKGROUND OF THE INVENTION

1. Field of the Invention

The present invention relates generally to multi-fiber ferrules that more easily make physical contact in a connector system and a method of evaluating the multi-fiber ferrules, and, more particularly, to ferrules with optical fibers having a particular optical fiber tip radius and modulus of elasticity and a method for determining these characteristics.

2. Technical Background

Multi-fiber, monolithic ferrules are used in a vide variety of optical interconnect applications, including bulkhead feed-through connectivity, optical back planes, and outside feed plant passive optical networks. The typical MT ferrule is comprised of at least one fiber array with up to twelve 125 micron diameter fibers on a 250 micron centerline spacing. The MT ferrule has rectangular cross section of 2.4 millimeters by 6.4 millimeters and depth of 8 millimeters. The ferrules are generally molded from a highly glassed-filled, thermoplastic or thermoset resin, which combines the durability and stability required of a connector with the precision necessary to maintain low-loss single mode core-to-core alignment across multiple fibers. Other single row ferrules with four, eight, or twelve fibers are the most common, multi-row MT ferrules with up to 72 fibers being readily available. This high density interconnect package offers a compact, convenient means for quickly and effectively distributing large numbers of optical fibers. To assure precision alignment between two mating MT ferrule-based connectors, a non-interference, dual guide pin and hole system is used. One connector in the pair typically houses both guide pins while the mating, unpinned connector ferrule receives the guide pins when mated. The pinned and unpinned ferrules have identical geometries.

In order to establish a reliable, dry, low insertion loss, and low reflectance junction, physical contact between each fiber tip is imperative. Even with very accurate core-to-core alignment, power loss from Fresnel effects, which are associated with gaps between fiber tips, will not meet the requirements of today's WDM and Passive Optical Network applications. To achieve a physical contact, the ferrule and face is prepared such that the fiber tips are protruding from the ferrule surface.

It would be desirable therefore to provide multi-fiber ferrules in which all of the optical fibers make physical contact with the other optical fibers in a connector system with less force on the multi-fiber ferrules and the connector system and a method for determining which multi-fiber ferrules will most likely achieve that contact before they are installed into the system.

SUMMARY OF THE INVENTION

Disclosed herein is an optical ferrule that includes a ferrule body having a front face and a rear face, at least two optical fiber openings extending through the ferrule body between the front face and rear face, and at least one optical fiber secured in at least one of the at least two optical fiber openings, the optical fiber having a fiber tip radius that is less than 2 mm.

In some embodiments, the fiber tip radius is about 1 mm.

In another aspect, a method is disclosed for qualifying a multi-fiber ferrule assembly as being adequate to make physical contact upon mating, the multi-fiber ferrule assembly comprising a ferrule having an end face with optical fibers protruding through the end face, the method including measuring a radius of each optical fiber tip in the multi-fiber ferrule assembly, and qualifying the multi-fiber ferrule assembly if each of the optical fiber tips have a radius of less than about 2.0 mm.

In another aspect, a method is disclosed for qualifying a multi-fiber ferrule assembly as being adequate to make physical contact upon mating, the multi-fiber ferrule assembly comprising a ferrule having an end face with optical fibers protruding through the end face, the method including measuring a modulus of elasticity of the ferrule and qualifying the multi-fiber ferrule assembly if the modulus of elasticity of the ferrule is less than 17 GPa.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiment(s) of the invention, examples of which are illustrated in the accompanying drawings. Whenever possible, the same reference numerals will be used throughout the drawings to refer to the same or like parts.

Figure 1:
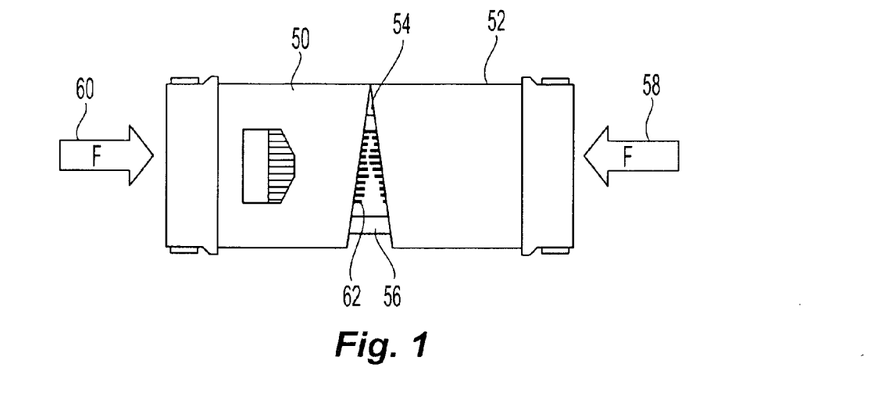
FIG. 1 is a schematic top view of a pair of MT ferrules showing, in an exaggerated way, the inaccuracies in prior art multi-fiber ferrules.

Referring to FIG. 1, two multi-fiber ferrules 50,52 in physical contact with one another and aligned by fiber optic guide pins 54,56. Although not illustrated, the two multi-fiber ferrules may have connector components to further assist in the alignment and protection of the multi-fiber ferrules. As illustrated by the arrows 58,60, a spring force F (from a spring in the connector portion) biases the two multi-fiber ferrules 50,52 toward one another to maintain physical contact between the two multi-fiber ferrules 50,52 and also the optical fibers 62. However, as illustrated in FIG. 1, while the two multi-fiber ferrules 50,52 may be in physical contact, at least some of the optical fibers 62 may not be in physical contact with one another. If the optical fibers are not in physical contact with a corresponding optical fiber, the signal is at least degraded across the junction, if not completely lost. Thus, the size of the spring force F is important in the quality of the mating pair of multi-fiber ferrules 50,52, and in particular, the mating of each of the optical fibers 62. Applicants have determined that the force F needed to cause the physical contact of the optical fibers depends mainly on the radius of the optical fiber tips and the protrusion distribution of the optical fibers beyond the end face of the multi-fiber ferrules 50,52.

Figure 2A:
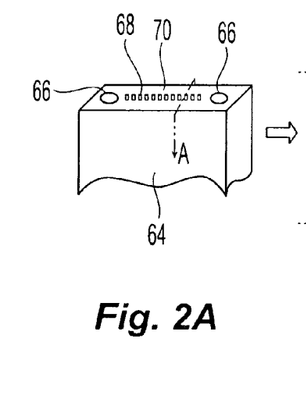
FIG. 2A illustrates a multi-fiber ferrule and optical fibers according to one embodiment of the present invention.
Figure 2B:
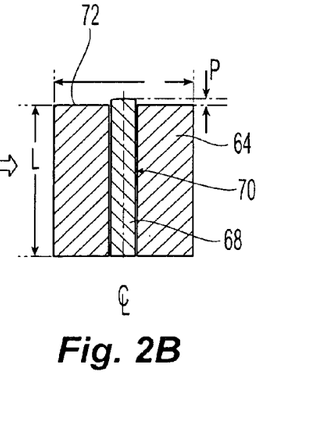
FIG. 2B is a cross-sectional view of the multi-fiber ferrule in FIG. 2A.

As illustrated in FIGS. 2A and 2B, a multi-fiber ferrule 64 has two fiber optic guide pin openings 66 for fiber optic guide pins (not shown) and a plurality of optical fibers 68 (12 are illustrated) secured in optical fiber openings 70 extending through the multi-fiber ferrule 64. As illustrated in the cross-sectional view of FIG. 2B, the optical fiber 68 is secured in the optical fiber opening 70, preferably with epoxy. The optical fiber 68 also protrudes beyond the end face 72 of the multi-fiber ferrule 64 so as to make contact with optical fibers from a corresponding ferrule. As can be imagined, the optical fibers that protrude the farthest beyond the end face 72 of the multi-fiber ferrule 64 must be able to deform, deflect, compress or otherwise move to allow the shorter optical fibers to make contact with one another. It has been discovered that the forces on these optical fibers are transferred to the epoxy holding the optical fibers 68, multi-fiber ferrule 64 itself, and in deformation of the end of the optical fibers. Each of these issues will be addressed in turn below.

Figure 3:
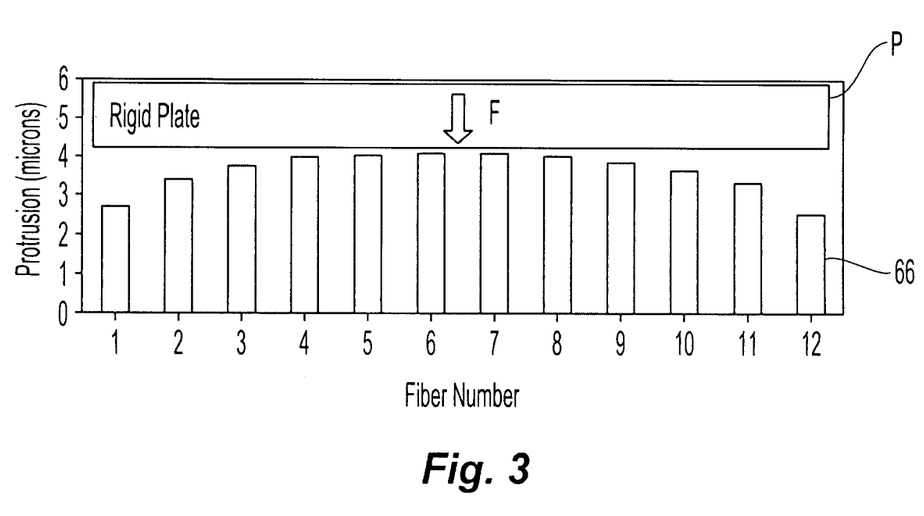
FIG. 3 is a conceptual drawing of the force applied to the optical fibers in a multi-fiber ferrule when mated and also illustrates one method in determining the force required for the tips of optical fibers in the multi-fiber ferrule to make contact with a rigid plate.

FIG. 3 illustrates a typical profile of twelve optical fibers 66 protruding through an end face of a multi-fiber ferrule (the ferrule is not shown, but the end face of the ferrule is represented at zero protrusion). The rigid plate P represents the force F exerted on the optical fibers 66 when in a mated relationship. As can be seen in FIG. 3, the force F must be sufficient to move the optical fibers in the center of the multi-fiber ferrule more than a micron (as they extend more than 1 micron beyond the shortest optical fiber) to allow all of the optical fibers, and in particular, the outside optical fibers to come in contact with the rigid plate P. It should be noted that if the optical fibers 66 in FIG. 3 are to be mated with another multi-fiber ferrule having the same optical fiber profile, then the optical fibers on each side need move more than a micron.

Figure 4:
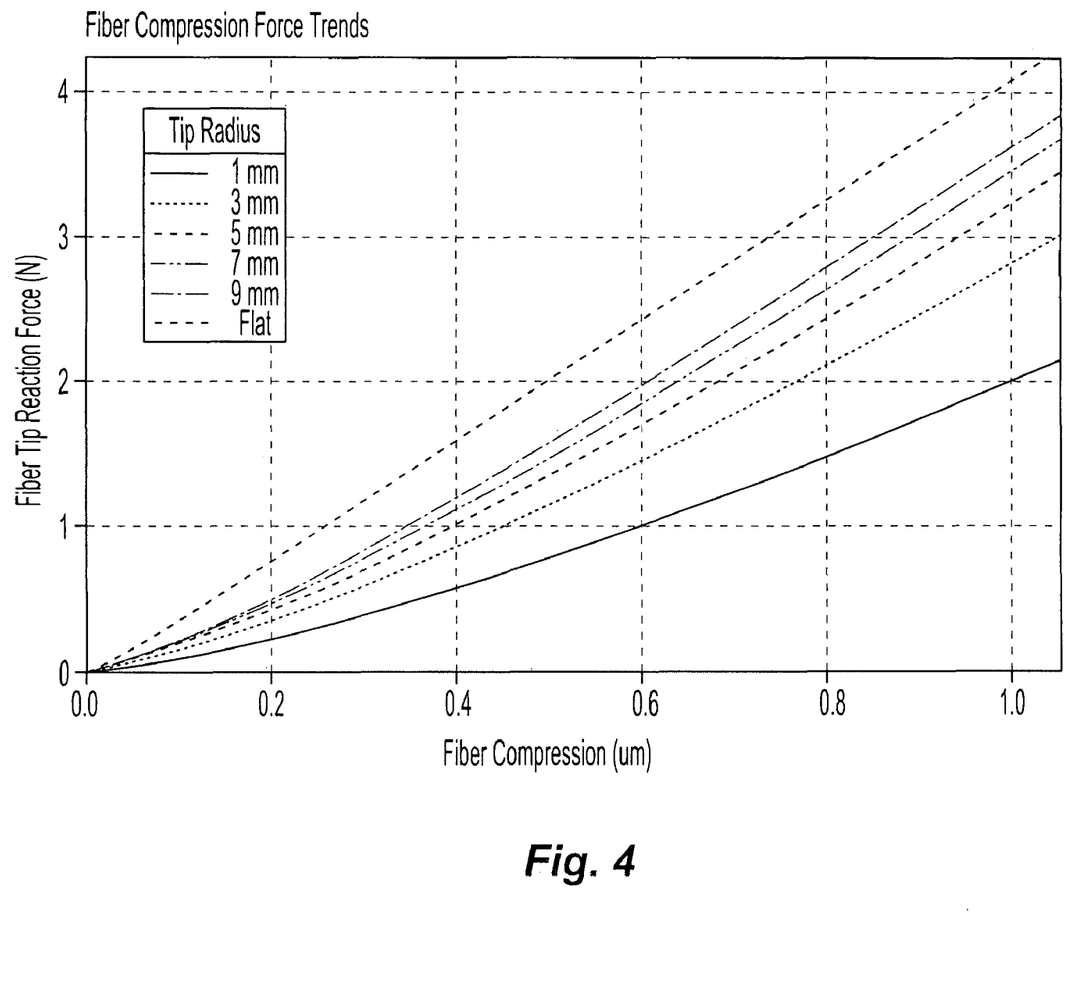
FIG. 4 is a graph illustrating the effect of the radius of the tip of the optical fiber on the fiber tip reactions forces as a function of fiber displacement.

FIG. 4 illustrates how the radius of the tip of the optical fibers affect the force necessary to achieve a given optical fiber compression. It has been determined that the smaller the radius of the fiber tip of the optical fibers, a smaller the force is necessary to compress the optical fibers the same distance (in a direction toward the multi-fiber ferrule end face). As shown in FIG. 4 for example, it takes half the force to move an optical fiber with a 1.0 mm radius 0.6 microns than it does an optical fiber with a 9 mm radius. It has been determined that the as the fiber tip radius decreases, the equivalent spring constant (illustrated by the slope of the curves in FIG. 4) is reduced. For example, the optical fiber with a flat tip (infinite radius) has a spring constant of about 4.2 N/$\mu$m, while an optical fiber with a 1 mm radius has a spring constant of about 2.1 N/$\mu$m. As can also be seen in FIG. 4, as the radius of the optical fiber tip radius decreases, so does the linearity of the spring constant. This suggests that there are two components to the fiber tip displacement: (1) The composite stiffness of the ferrule, fiber, and epoxy, and (2) the classical Hertzian contact deformation of the glass fiber tip. For large fiber tip radii, the composite stiffness is largely responsible for tip displacement, while the Hertzian effect plays a minor role; whereas, for small radii, the impact of the Hertzian component becomes noticeable. Thus, the smaller the radius of the optical fiber tip, the less force (F) is needed to be able to achieve physical contact between opposing optical fibers in mated multi-fiber ferrules. However, as noted above, there are several factors that affect the ability of multi-fiber ferrules and optical fibers to physically engage one another. Preferably, the optical fibers will have a tip radius of less than 1 mm and more preferably less than 0.5 mm.

Figure 5:
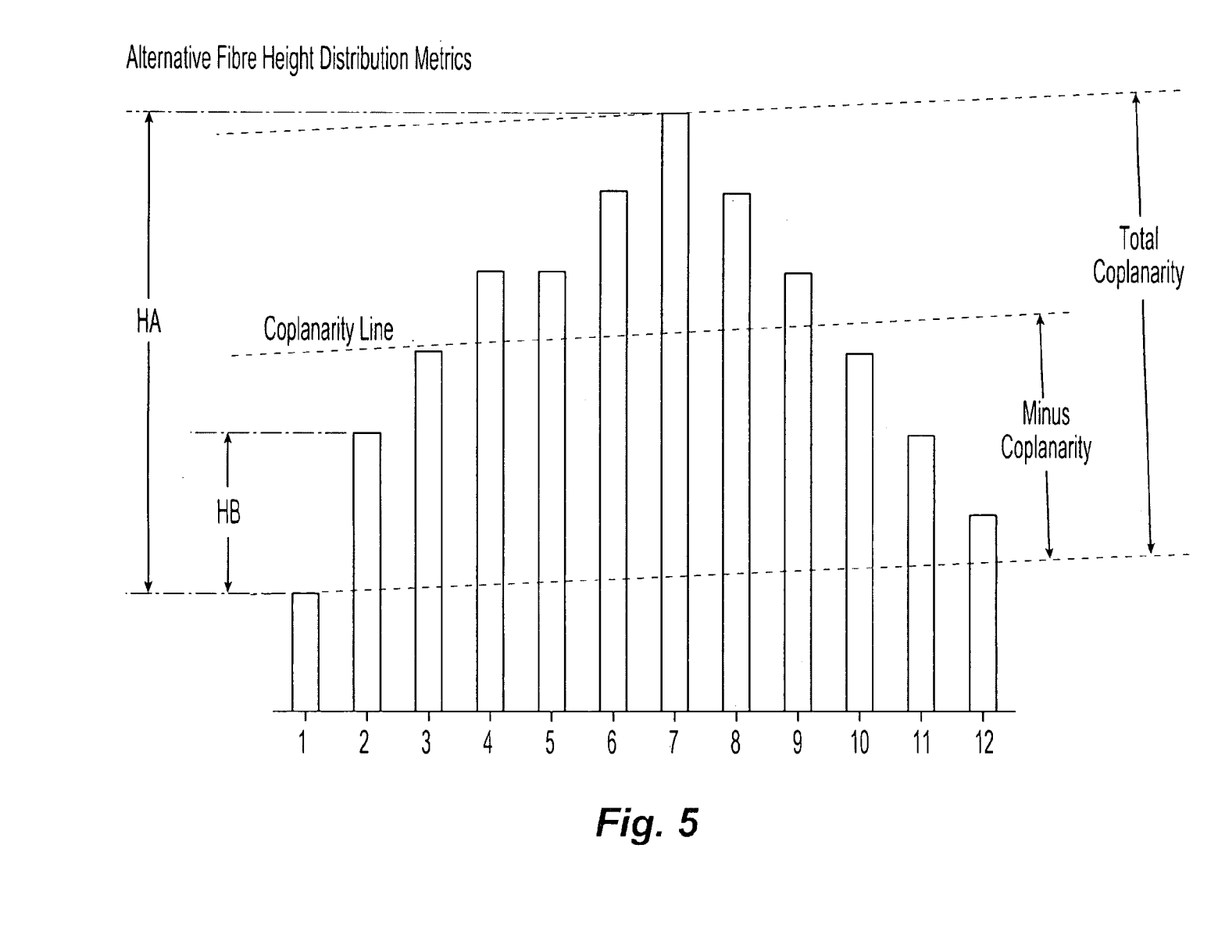
FIG. 5 illustrates coplanarity of optical fibers in a 12-fiber multi-fiber ferrule.

FIG. 5 illustrates the next factor to affect the contact of multi-fiber ferrules and the optical fibers. Illustrated are the principles of coplanarity and minus coplanarity for a profile of optical fibers extending beyond the end face of a multi-fiber ferrule. To use these principles to determine whether the ferrules and optical fibers will mate with another ferrule (or connector), several steps are necessary. First, the coplanarity plane CP for the optical fibers is determined. In order to determine where the coplanarity plane CP is located relative to the profile of the optical fibers, the protrusion distance beyond the end face of each of the twelve optical fibers must be measured. The coplanarity plane CP is then determined by the best fit of the least squares method. While the coplanarity plane CP is illustrated in FIG. 5 as being associated with the end of the third optical fiber, it should be noted that it may fall anywhere along the profile. Once the protrusion of each of the optical fibers is determined, it is also possible to determine the total coplanarity HA, which is the difference in the distance from the fiber tip with the longest protrusion and fiber tip with the shortest protrusion. Similarly, the adjacent height difference HB, which is the largest difference in distances between adjacent optical fiber tips, may also be determined. Most importantly, however, once the coplanarity plane CP is determined, it is possible to determine the minus coplanarity of the optical fibers, which is the difference in the distance between the location of the coplanarity plane CP and the tip of the shortest optical fiber.

Figure 6:
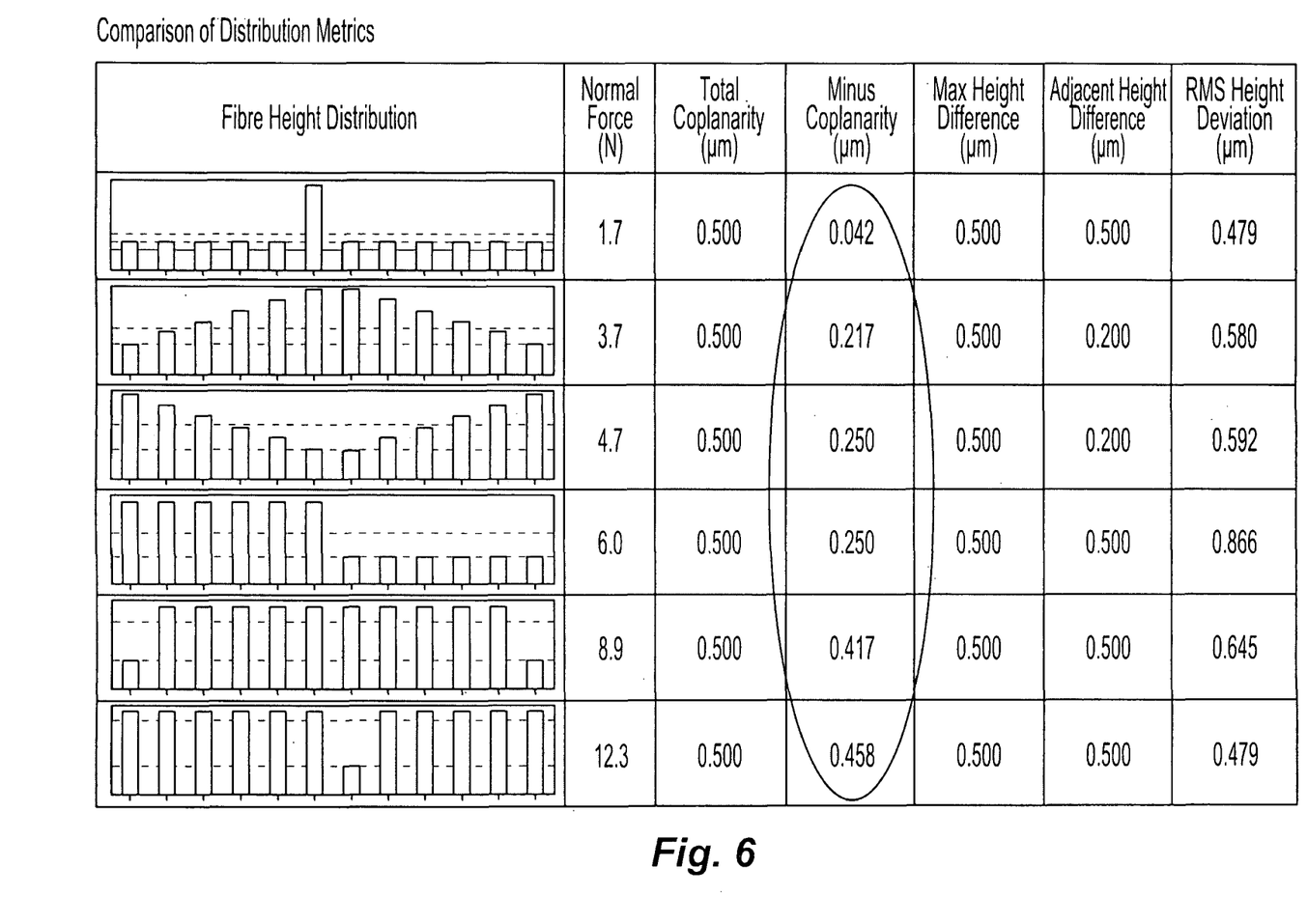
FIG. 6 illustrates a variety of coplanarity measurements for a variety of differing optical fiber heights in a multi-fiber ferrule.

As illustrated in FIG. 6, for optical fibers having the same fiber tip radius, the characteristic that best predicts the smallest force F to allow for proper mating for a particular fiber distribution is the minus coplanarity. As the minus coplanarity increases, so too does the force required for all of the optical fibers to contact the plate as illustrated in FIG. 3. For each of the different optical fiber profiles, all of the other characteristics, including, for example, total coplanarity and adjacent height difference, do not predict the smallest force necessary to allow for proper mating with other optical ferrules as well as the minus coplanarity. Preferably the coplanarity will be less than 0.250 microns and more preferably less than 0.100 microns.

Figure 7:
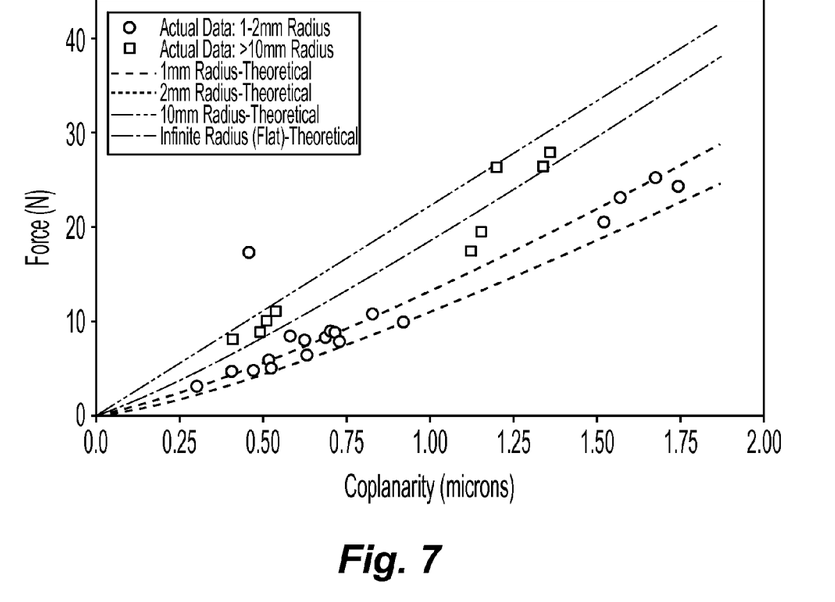
FIG. 7 is a graph illustrating the effect of coplanarity of the optical fibers on the force to make contact with all of the optical fibers as a function of the fiber tip radius.

FIG. 7 illustrates the effects of both the fiber tip radius and minus coplanarity on the force necessary to move the optical fibers. Illustrated are both actual and theoretical values of the force to move the optical fibers for 1-2 mm and 10 mm radiused fiber tips. As illustrated and discussed above, the smaller the coplanarity, the smaller the force required to move the optical fibers a given distance. The graph in FIG. 7 also confirms that the smaller the fiber tip radius, a smaller the force is needed to move the optical fibers than for larger fiber tip diameters with the same coplanarity. Combining the two characteristics, a small minus coplanarity and fiber tip radius, reduces the forces necessary for optical fiber contact than either one alone.

Figure 8A:
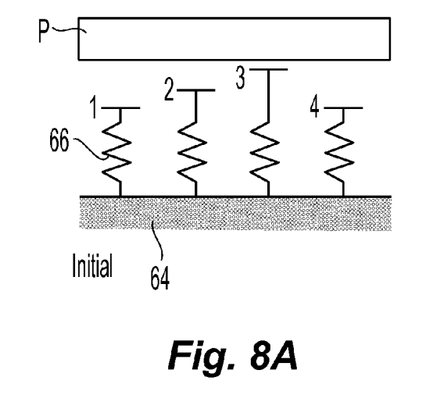
FIGS. 8A and 8B are a conceptual drawing of a multi-fiber ferrule with four optical fibers before and after contact with a rigid plate and the effect on the multi-fiber ferrule as well as the optical fibers.
Figure 8B:
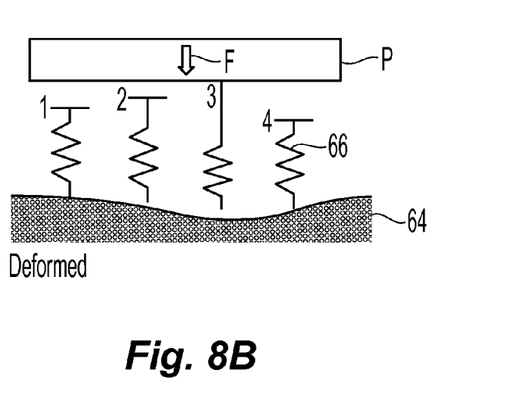
Figure 9:
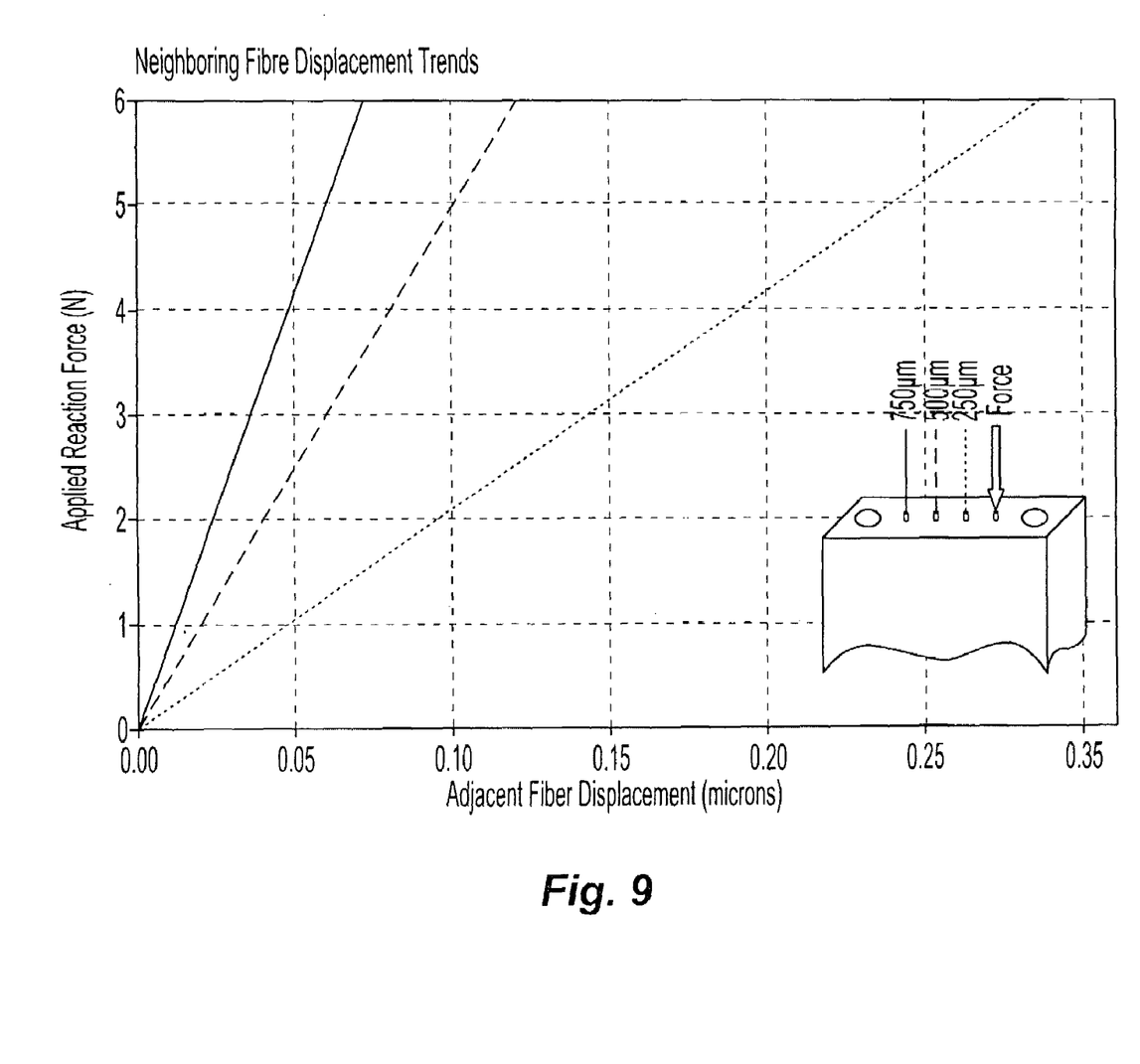
FIG. 9 is a graph illustrating the force applied plotted as a function of the displacement of adjacent fibers for a variety of distances of the optical fibers from the fiber to which the force is applied.

Another influence on the movement of the optical fibers is the deformation of the foundation or multi-fiber ferrule in the vicinity of the optical ferrule. That is, when force is applied to an optical fiber in the multi-fiber ferrule, the multi-fiber ferrule will compress or otherwise move. This deformation of the foundation is illustrated in FIGS. 8A and 8B. In FIG. 8A, before the force F is applied by the rigid plate P, the multi-fiber ferrule 64 (a conceptual drawing with four optical fibers 66 illustrated) does not show any deformation. However, after the force F is applied to a single optical fiber 66, the deformation of the multi-fiber ferrule 64 is obvious in FIG. 8B. The deformation in the multi-fiber ferrule 64 also causes adjacent optical fibers 66 to also move downward and away from the force even though the force is not being applied to the other fibers. This is further illustrated in the graph in FIG. 9. The displacement or movement of the adjacent optical fibers depends on the force F applied to the optical fiber and the location of the affected optical fiber relative to the optical fiber having the force F applied. As would be expected, the optical fiber directly adjacent to the optical fiber having the force applied moves more than the optical fibers that are a farther distance away from that optical fiber. Also of interest is that the larger the force, the larger the difference between the movement of the adjacent optical fibers.

Figure 10:
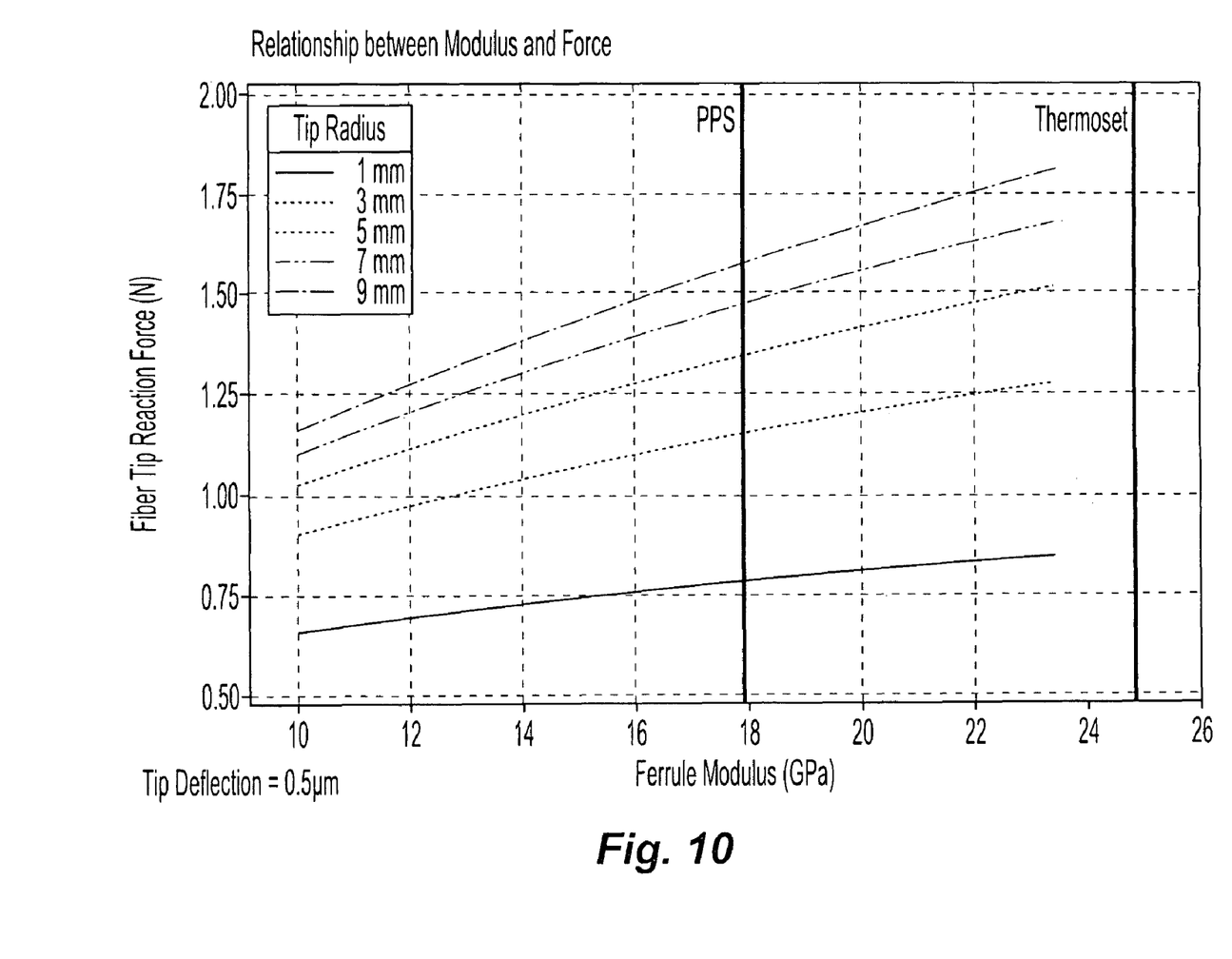
FIG. 10 is graph illustrating the relationship between modulus and force for a variety of optical fiber tip radiuses.

The composition of or the materials used to make the multi-fiber ferrule also have an impact on the force required for optical fiber movement and displacement of the adjacent optical fibers. Illustrated in FIG. 10 is the force required to cause 0.5 microns deflection as a function of the multi-fiber ferrule modulus for a number of different fiber tip radius. It should be noted that polyphenylene sulphide (PPS) MT ferrules have a modulus of about 18 GPa and thermoset MT ferrules have a modulus of about 25 GPa. As can be seen, the higher the modulus, the higher the force needed to move the fiber tips the same distance. And, for a given modulus, the smaller the radius the smaller the force is required for the same fiber tip movement.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical ferrule consisting of:
    a ferrule body having a front face and a rear face;
    at least two optical fiber openings extending through the ferrule body between the front face and rear face; and
    at least one optical fiber secured in at least one of the at least two optical fiber openings and the at least one optical fiber extending beyond both the front and the rear faces, the at least one optical fiber protruding beyond the front face having a fiber tip radius that is between about 2 mm and about 0.5 mm.

2. The optical ferrule according to claim 1, wherein the fiber tip radius is about 1 mm.

3. The optical ferrule according to claim 1, wherein the rear face is a rearmost face of the ferrule body.

4. An optical ferrule consisting of:
    a ferrule body having a ferrule material with a modulus of elasticity less than 17 GPa;
    at least two optical fiber openings extending through the ferrule body;
    at least two optical fibers secured within the at least two optical fiber openings and extending through a front portion of the optical ferrule, the optical fiber extending through the front portion of the optical ferrule configured to mate with an opposing optical fiber.

5. The optical ferrule according to claim 4, wherein the optical fibers have a fiber tip radius of between about 2 mm and about 0.5 mm.

6. A fiber optic assembly comprising:
    a pair of optical ferrules, each of the optical ferrules having a front face and a rear face;
    at least two optical fiber openings extending through each of the optical ferrules between the front face and rear face; and
    at least one optical fiber secured in at least one of the at least two optical fiber openings in each of the optical ferrules and the at least one optical fiber extending beyond both the front and the rear faces, the at least one optical fiber protruding beyond the front face having a fiber tip radius that is between about 2.0 mm and about 0.5 mm, wherein the pair of optical ferrules are positioned with the front faces toward one another and the at least one optical fiber in the optical ferrules being in contact with the at least one optical fiber in the other of the pair of optical ferrules.

7. The fiber optic assembly according to claim 6, wherein the at least two optical fiber openings comprises six optical fiber openings and the at least one optical fibers comprises six optical fibers, each of the optical fibers disposed in a respective optical fiber opening and each of the optical fibers in one of the pair of optical ferrules is in physical contact with a respective one of the optical fibers in the other of the pair of optical ferrules.

8. The fiber optic assembly according to claim 6, wherein each of the pair of optical ferrules has a modulus of elasticity less than 17 GPa.

9. A method of qualifying a multi-fiber ferrule assembly as being adequate to make physical contact upon mating, the multi-fiber ferrule assembly comprising a ferrule having an end face with optical fibers protruding through the end face, the method comprising:
    measuring a radius of each optical fiber tip in the multi-fiber ferrule assembly; and
    qualifying the multi-fiber ferrule assembly if each of the optical fiber tips have a radius of less than about 2.0 mm.

10. The method of qualifying a multi-fiber ferrule assembly according to claim 9, wherein the multi-fiber ferrule assembly is qualified if the radius of each optical fiber tip is less than about 1 mm.

11. The method of qualifying a multi-fiber ferrule assembly according to claim 9, further comprising the step of measuring a modulus of elasticity of the ferrule and wherein the multi-fiber ferrule assembly is qualified if the modulus of elasticity of the ferrule is less than 17 GPa.

12. The method of qualifying a multi-fiber ferrule assembly according to claim 9, wherein the multi-fiber ferrule assembly is qualified if at least 85% of the optical fiber tips have a radius of less than about 2.0 mm.

13. A method of qualifying a multi-fiber ferrule assembly as being adequate to make physical contact upon mating, the multi-fiber ferrule assembly comprising a ferrule having an end face with optical fibers protruding through the end face, the method comprising:

measuring a modulus of elasticity of the ferrule; and qualifying the multi-fiber ferrule assembly if the modulus of elasticity of the ferrule is less than 17 GPa.

* * * * *